Sept. 23, 1924.
B. C. SKINNER
CLUTCH
Filed Oct. 3, 1921
1,509,446
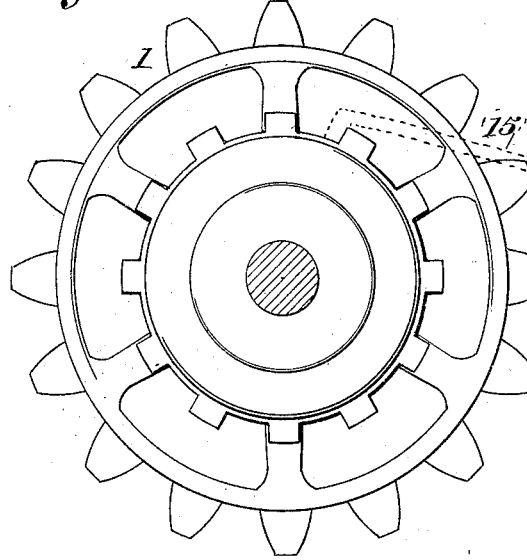
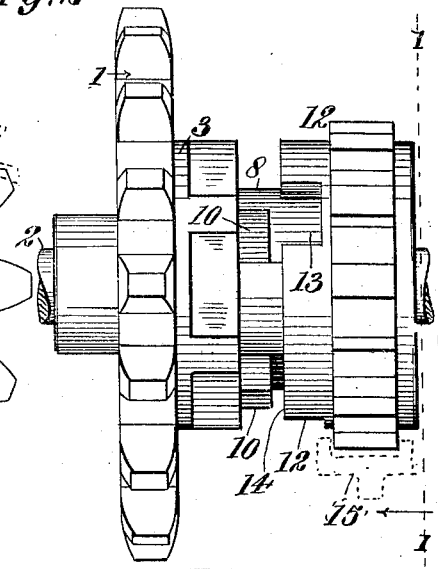
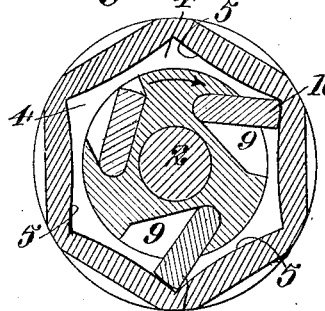
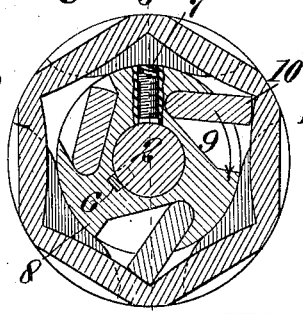
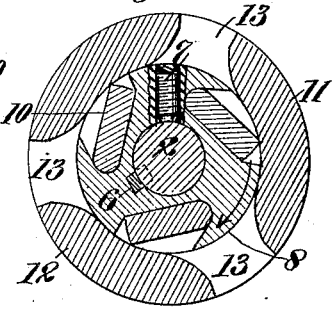
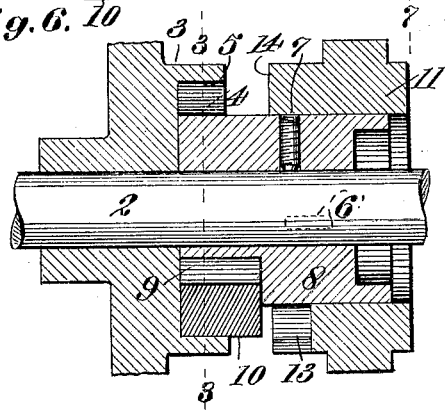
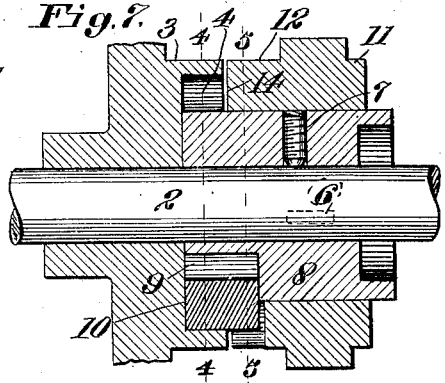
Inventor,
B.C.Skinner,
By Acker & Potter
Attorneys Patented Sept. 23, 1924.

1,509,446

UNITED STATES PATENT OFFICE.

BRONSON C. SKINNER, OF DUNEDIN, FLORIDA, ASSIGNOR TO SKINNER MACHINERY COMPANY, OF DUNEDIN, FLORIDA, A CORPORATION OF FLORIDA.

CLUTCH.

Application filed October 3, 1921. Serial No. 504,875.

*To all whom it may concern:*

Be it known that I, BRONSON C. SKINNER, a citizen of the United States, residing at Dunedin, in the county of Pinellas and State of Florida, have invented certain new and useful Improvements in Clutches, of which the following is a specification.

From actual experience in the use of a dog clutch of the type illustrated in Letters Patent No. 1,307,695 granted to George D. Parker, June 24, 1919, it has been found that the single dog of the spring actuated type is inefficient in that its controlling spring, due to the strain placed thereon, often breaks, causing considerable delay in the operation of the machine while it is being repaired. A further objection is that with a single pawl considerable movement of the driving member is required before the pawl interlocks the same with the driven member, causing a simultaneous operation thereof.

The object of the present invention is to overcome the objections present in the construction of the patent set forth and to provide a dog clutch containing a plurality of spring free or gravity actuated clutch dogs, each adapted for engagement with a surface or stop on the other clutch member affording an engagement of the clutch members when one of the same is operated for only a portion of a complete revolution. A further object is to provide a simple form of dog engaging surfaces and of collar receiving slots enabling the manufacture of the clutch at a very low figure.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein—

Fig. 1 is a view in front elevation of the preferred embodiment of my invention taken on line 1—1 of Figure 2.

Fig. 2 is a view in side elevation with the clutch collar in inoperative position.

Fig. 3 is a section on the line 3—3 of Fig. 6, disclosing the clutch dogs in engaged position.

Fig. 4 is a section on line 4—4 of Fig. 7 illustrating the dog receiving slots of the collar in register with the dogs.

Fig. 5 is a section on line 5—5 of Fig. 7, illustrating the dogs in disengaged position.

Fig. 6 is a longitudinal sectional view on line 6—7 of Fig. 4 with the collar in disengaged position.

Fig. 7 is a view on a similar line with the collar in engaged position.

In the embodiment of the invention illustrated, the drive member consists of a toothed sprocket 1 rotatably mounted on a driven shaft 2 and the hub of said sprocket projects laterally of one face thereof, as at 3, and is formed on its interior with a recess 4 polygonal in end elevation affording a plurality of angularly disposed faces 5 with which are adapted to contact the ends of clutch dogs, hereinafter described.

Keyed as at 6 to rotate with the shaft 2 and held from longitudinal movement thereon by the locking of set screw 7 is a sleeve 8 projecting into the recess 4 and formed on its surface with a plurality of radially disposed dog receiving depressions 9 in each of which is pivotally mounted a clutch dog 10, the free ends of which are adapted for projecting beyond the surface of the sleeve 8 solely by the force of gravity and to engage with the faces 5 to afford a driving connection between members 1 and 2. The dogs 10 are of a width to project beyond the end of the hollow hub 3 as illustrated in Figs. 2, 6 and 7.

Mounted on the sleeve 8 and capable of longitudinal movement thereon and also of rotative movement thereon, is a clutch collar 11, the hub 12 of which facing said hub 3 is inwardly slotted as at 13, said slots being spaced to correspond with the spacing of the dogs 10 to insure the alignment of all of said dogs with said slots when it is desired.

The interior diameter of the hub 12 of the collar 11 corresponds to the exterior diameter of the sleeve 8 and on the movement of said collar longitudinally of the sleeve 8 toward the dogs 10, by the lateral movement of member 15 the outer edges of said dogs will ride on the end wall 14 of the hub 12 until such time as the same register with one of the slots 13, which will permit further longitudinal movement of the collar on sleeve 8.

When this latter movement takes place and the collar is held from rotation with the shaft 2 by the engaging and shifting member 15 engaging the teeth of collar 12, the free ends of the dogs 10 are caused to move beneath the solid portions of the hub 12 intermediate the slots 13, and this action forces the dogs 10 inwardly into their receiving depressions 9 disengaging the free ends thereof from contact with the faces or surfaces 5, and releasing the drive from the driven member. The member 15 is illustrated as having a forked end, the tines thereof projecting one on each side of the toothed portion of collar 12 to enable longitudinal movement to be imparted to the collar, the body of the member adapted for engaging between the teeth to arrest its rotation.

When it is desired to again operate the driven member, it is only necessary that the collar 12 be moved longitudinally on the sleeve 8 in a direction from the hub 3 and the rotation of the member 1 and its slight friction on shaft 2 and against the end of sleeve 8 will position the shaft 2 so that the free end of one of said dogs 10 will drop by gravity and engage one of the surfaces 5, causing a rotation of the shaft 2 and sleeve 8 therewith, and after a complete revolution of the same, all of said dogs 10 will have engaged their cooperating faces.

Having thus described my invention, what I claim as new and desire to secure by Letters Patent of the United States is:—

In combination with a drive sprocket formed with a recess opening at one end of the hub thereof and said recess being formed on its interior with a plurality of symmetrical angularly disposed clutch dog engaging faces, a driven shaft rotatably mounting said sprocket, a sleeve keyed to said shaft and extending into said hub recess, said sleeve provided on its periphery with a plurality of radially disposed clutch dog mounting depressions, a clutch dog pivotally mounted in each of said depressions with its free end adapted for swinging movement by gravity beyond the periphery of said sleeve to engage with said dog engaging faces, said dogs adapted to project beyond the end of said recess hub, a collar mounted for free movement on said sleeve and inwardly cut at its end to provide a plurality of dog receiving recesses for the reception of the free ends of said dogs when in engagement with said faces, and means for laterally moving said collar to position the same within the path of the projecting portions of said dogs and for holding the same stationary relatively to the rotating hub whereby said dogs on the rotation of said shaft are caused to pass beneath a portion of said collar separating said slots whereby said dogs are withdrawn from engagement with said faces.

In testimony whereof I have signed my name to this specification.

BRONSON C. SKINNER.